(12) United States Patent
Yousefi'zadeh et al.

(10) Patent No.: US 10,841,853 B1
(45) Date of Patent: Nov. 17, 2020

(54) AI-BASED LOAD BALANCING OF 5G CELLULAR NETWORKS

(71) Applicants: Homayoun Yousefi'zadeh, Irvine, CA (US); Amr Albanna, Irvine, CA (US)

(72) Inventors: Homayoun Yousefi'zadeh, Irvine, CA (US); Amr Albanna, Irvine, CA (US)

(73) Assignee: Cellonyx, Inc., Irvine, CA (US)

(*) Notice: Subject to any disclaimer, the term of this patent is extended or adjusted under 35 U.S.C. 154(b) by 0 days.

(21) Appl. No.: 16/599,273

(22) Filed: Oct. 11, 2019

(51) Int. Cl.
H04W 4/00 (2018.01)
H04W 36/22 (2009.01)
H04W 28/08 (2009.01)
H04W 24/02 (2009.01)
H04W 52/34 (2009.01)
G06N 5/04 (2006.01)
H04W 28/02 (2009.01)
H04W 36/00 (2009.01)
G06N 20/00 (2019.01)
H04W 16/28 (2009.01)

(52) U.S. Cl.
CPC .............. H04W 36/22 (2013.01); G06N 5/04 (2013.01); G06N 20/00 (2019.01); H04W 16/28 (2013.01); H04W 24/02 (2013.01); H04W 28/0252 (2013.01); H04W 28/08 (2013.01); H04W 36/00835 (2018.08); H04W 52/343 (2013.01)

(58) Field of Classification Search
CPC . H04W 28/08; H04W 36/22; H04W 72/0486; H04W 28/0289; H04W 52/343; H04L 47/10
See application file for complete search history.

(56) References Cited

U.S. PATENT DOCUMENTS

2017/0359752 A1* 12/2017 Yousefi'zadeh ...... H04W 36/22

* cited by examiner

Primary Examiner — Omoniyi Obayanju

(57) ABSTRACT

Load balancing of 5G cellular networks is achieved by reducing network congestion utilizing two components of learning and optimization. First, a number of learning approaches including Linear Least Square Regression (LLSR), Auto Regressive Integrated Moving Average (ARIMA), and Multi-Layer Perceptron Deep Learning (MLPDL) are used to model either Physical Resource Block (PRB) or Packet Dedicated Control CHannel (PDCCH) utilization as a function of average connected user equipment and predict the number of average users corresponding to predefined thresholds of congestion in utilizing cellular towers. Then, an optimization problem is formulated to minimize 5G network congestion subject to constraints of user quality and load preservation. Three alternative solutions, namely Constrained Simulated Annealing (CSA), Block Coordinated Descent Simulated Annealing (BCDSA), and Genetic Algorithms (GA) are presented to solve the optimization problem. Accordingly, integrated iterative methods, programs, and systems are described aiming at balancing the load of 5G cellular networks by redistributing traffic from congested cellular towers to non-congested cellular towers.

30 Claims, 11 Drawing Sheets

An exemplary flowchart of the present invention.

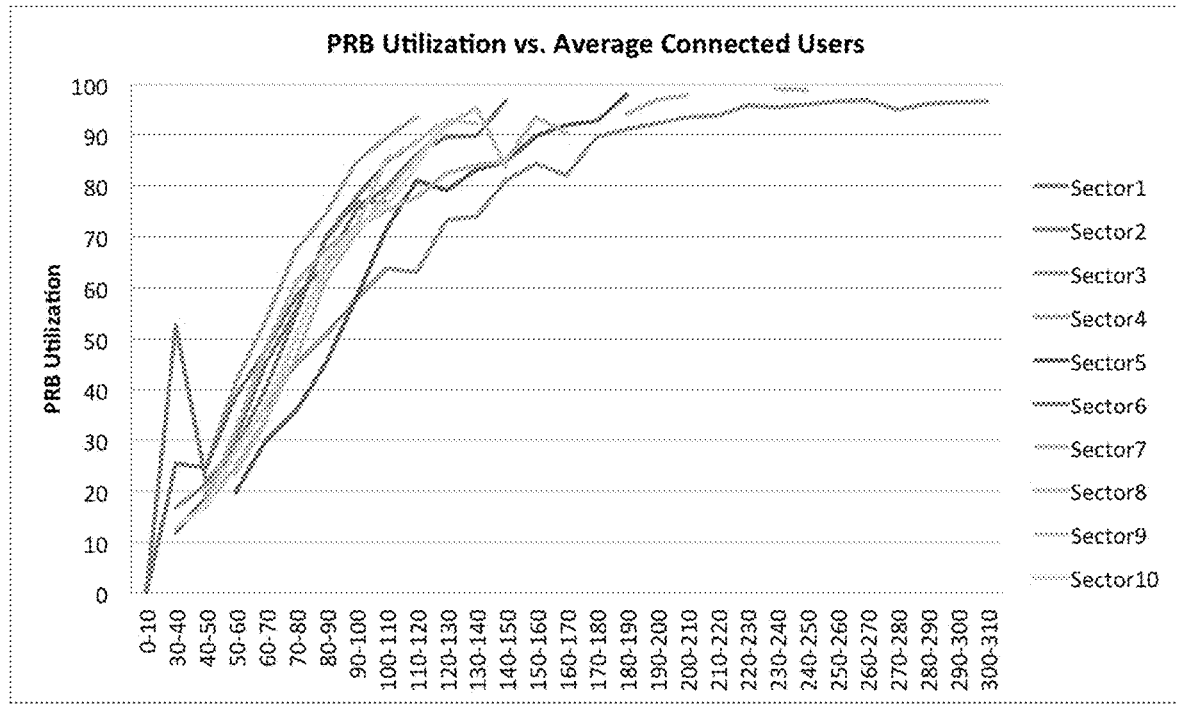
FIG. 1: Actual sample drawings of PRB utilization as a function of average connected UEs.

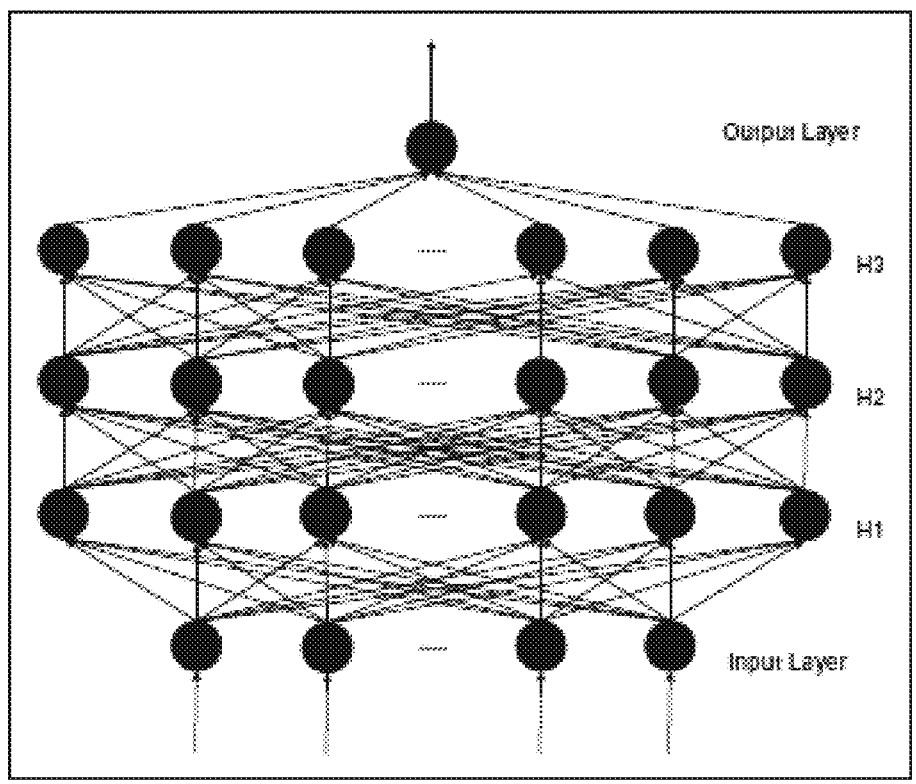
FIG. 2: Multi layer perceptron deep learning structure used for learning breakpoints of individual 5G cellular towers.

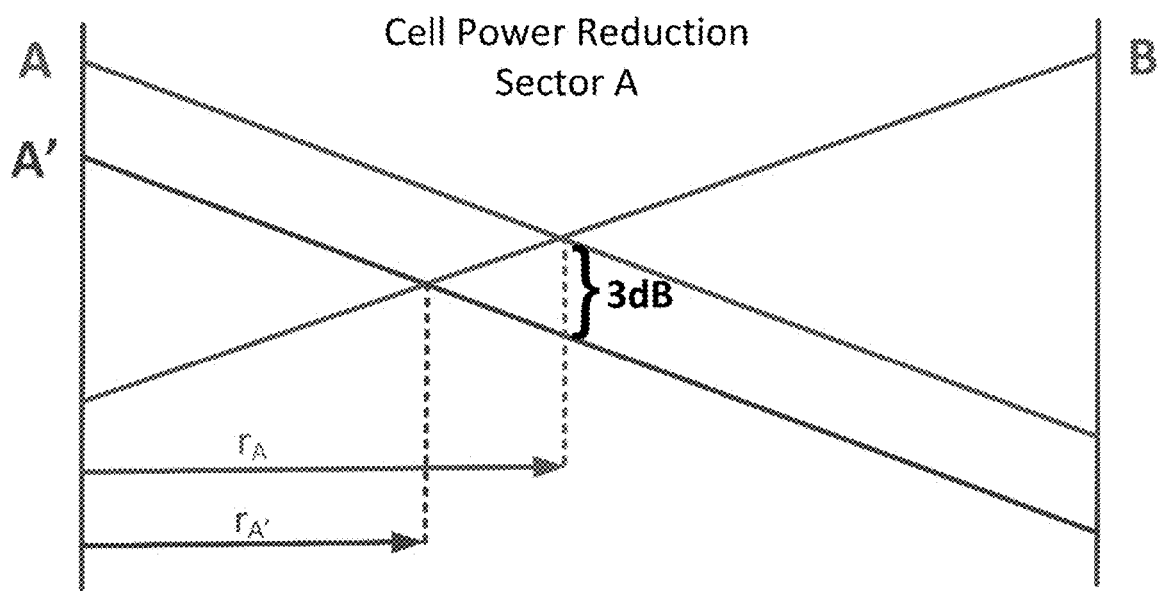
FIG. 3: The impact of changing power of cell A on reducing cell A coverage radius.

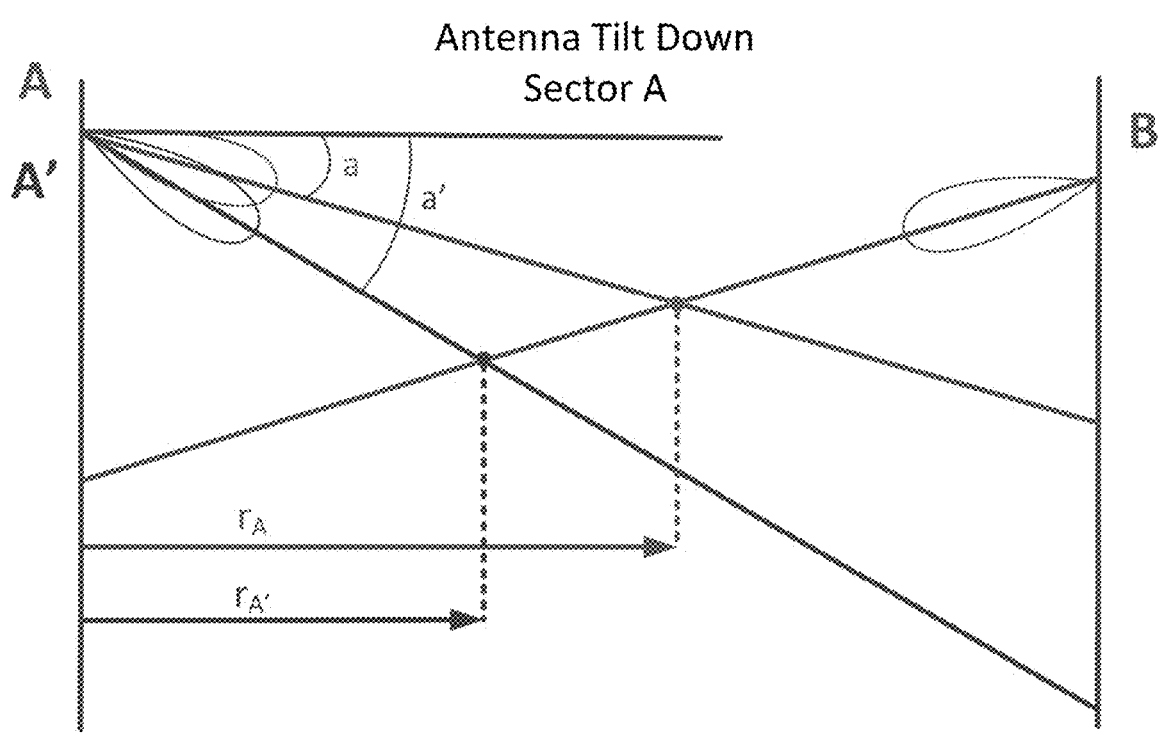
FIG. 4: The impact of antenna tilt down of cell A on reducing cell A coverage radius.

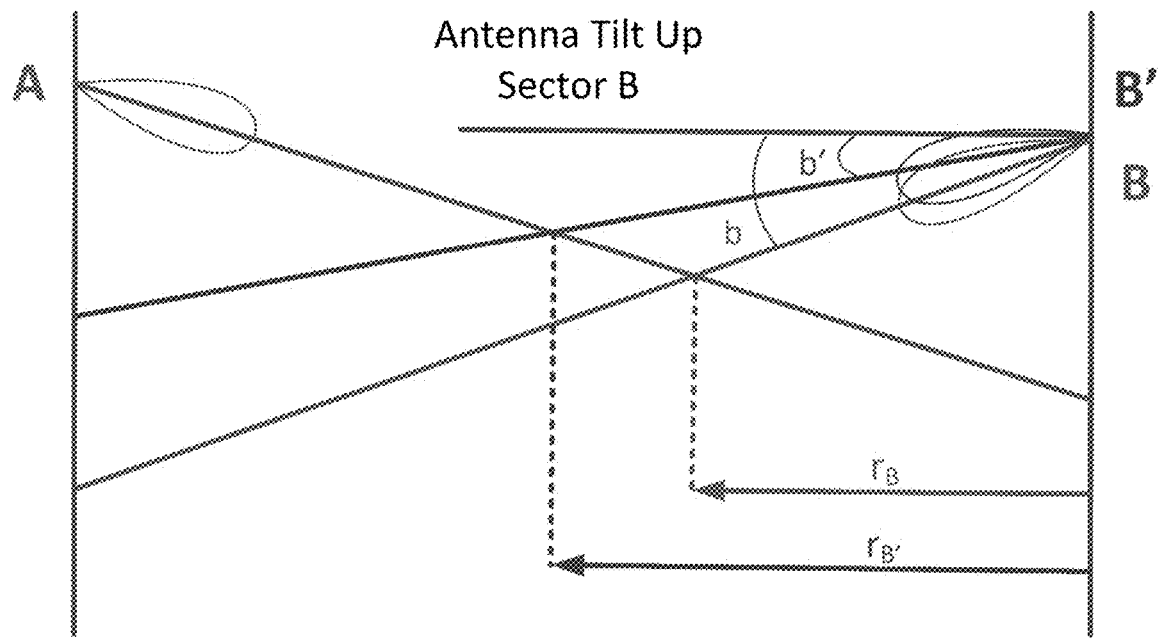
FIG. 5: The impact of antenna tilt up of cell B on reducing cell A coverage radius.

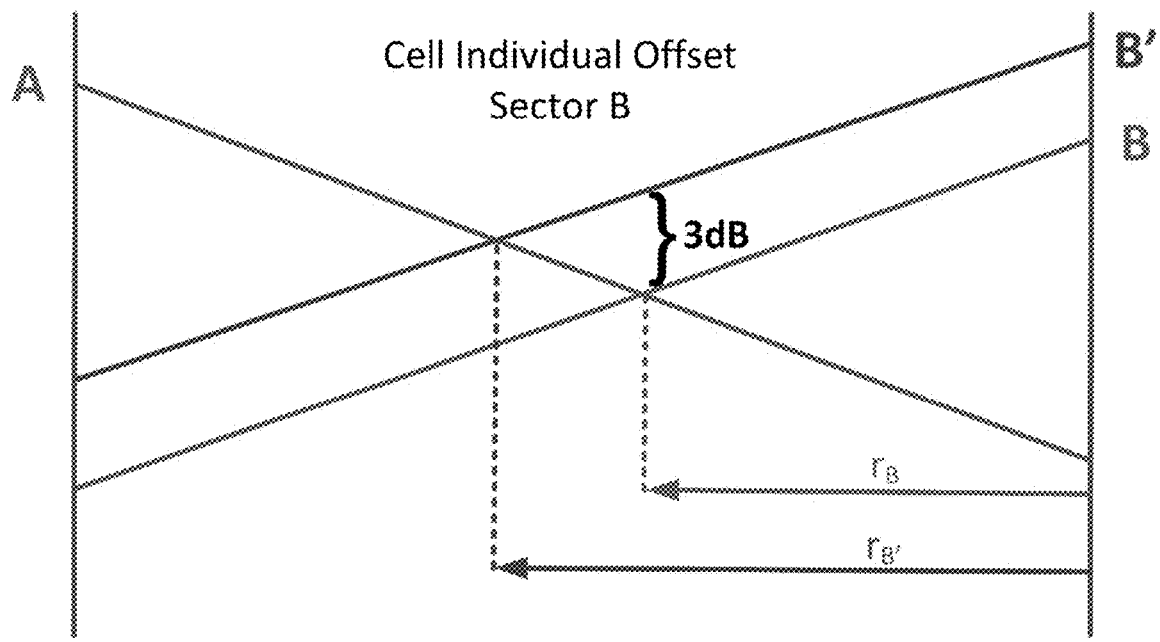
FIG. 6: The impact of changing handover threshold of cell A to cell B on reducing cell A coverage radius.

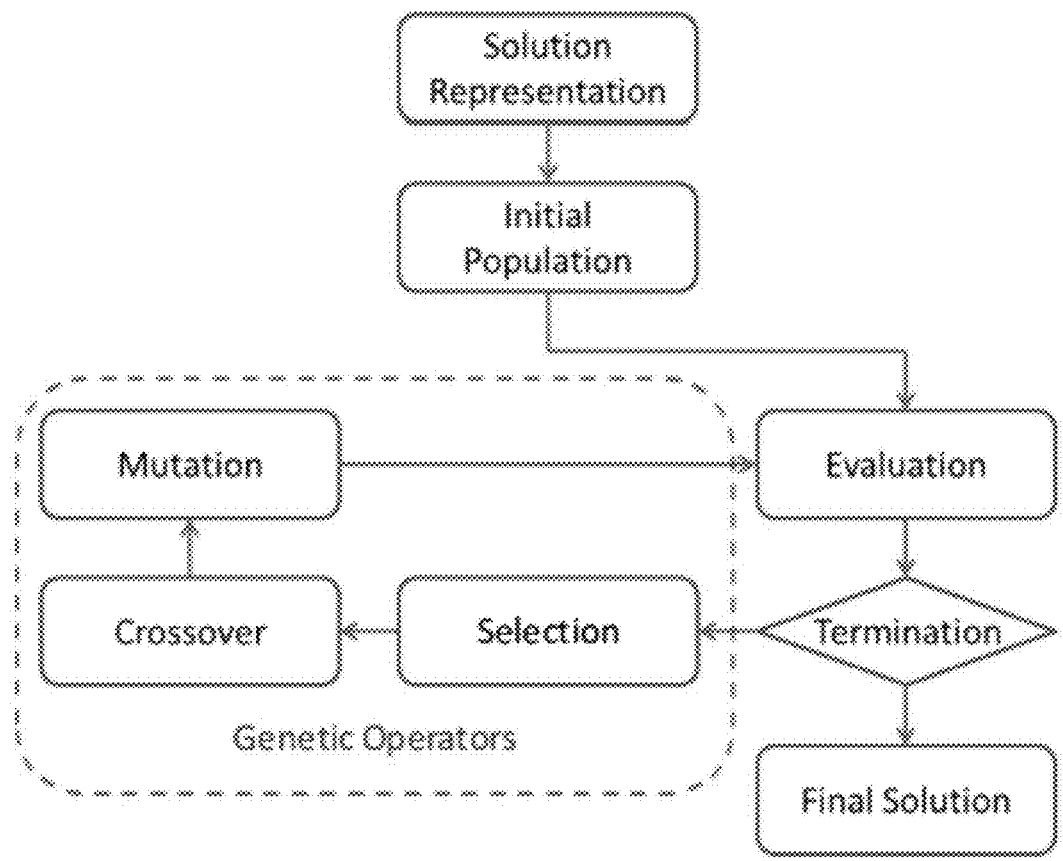
FIG. 7: A flowchart of the operation of GA algorithm.

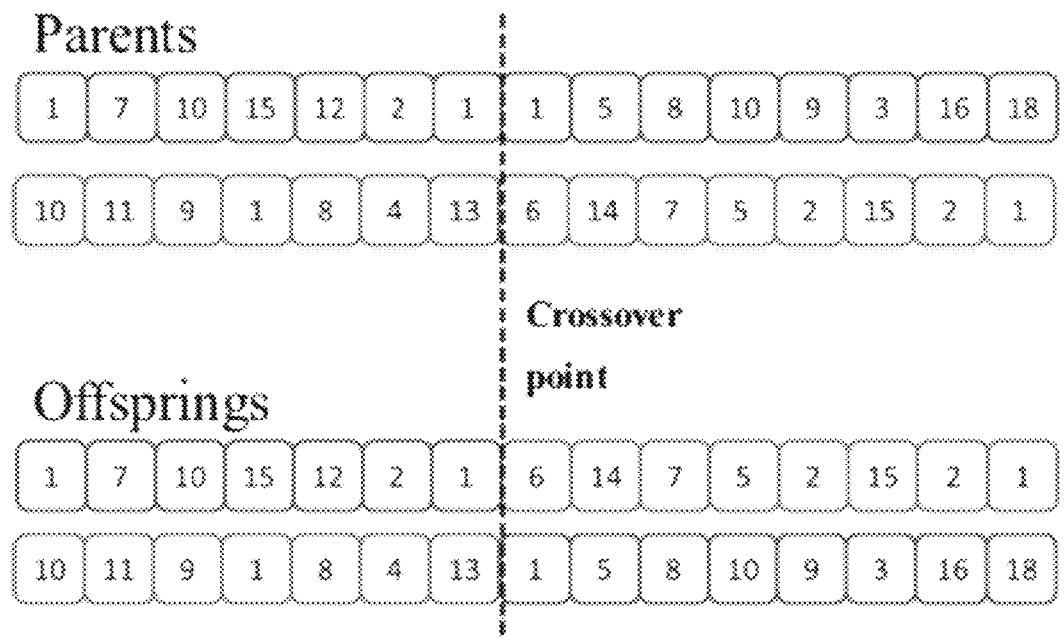
FIG. 8: An illustration of crossover operator in GA algorithm.

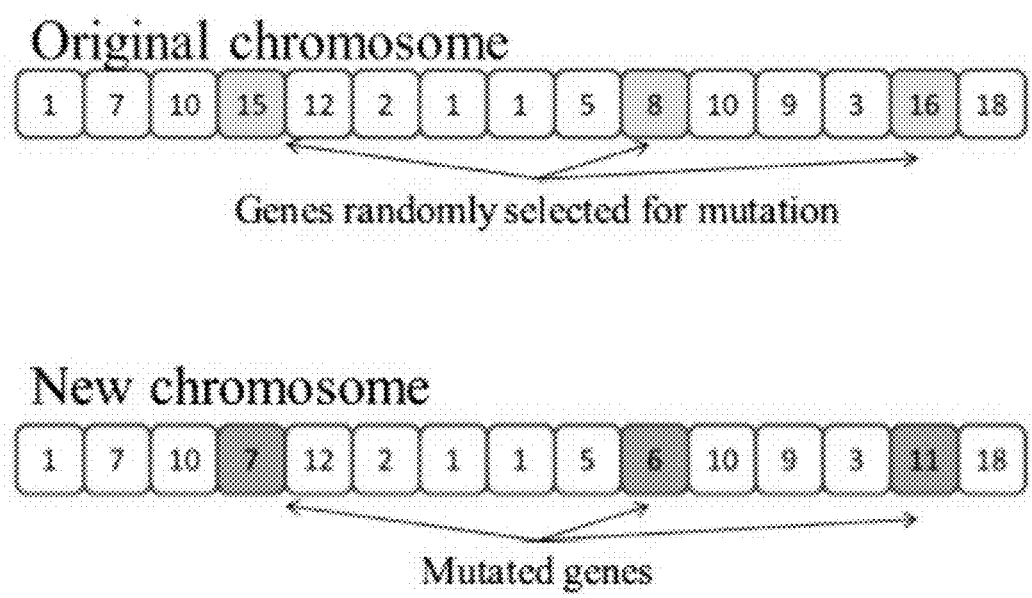
FIG. 9: An illustration of the mutation operator of GA algorithm.

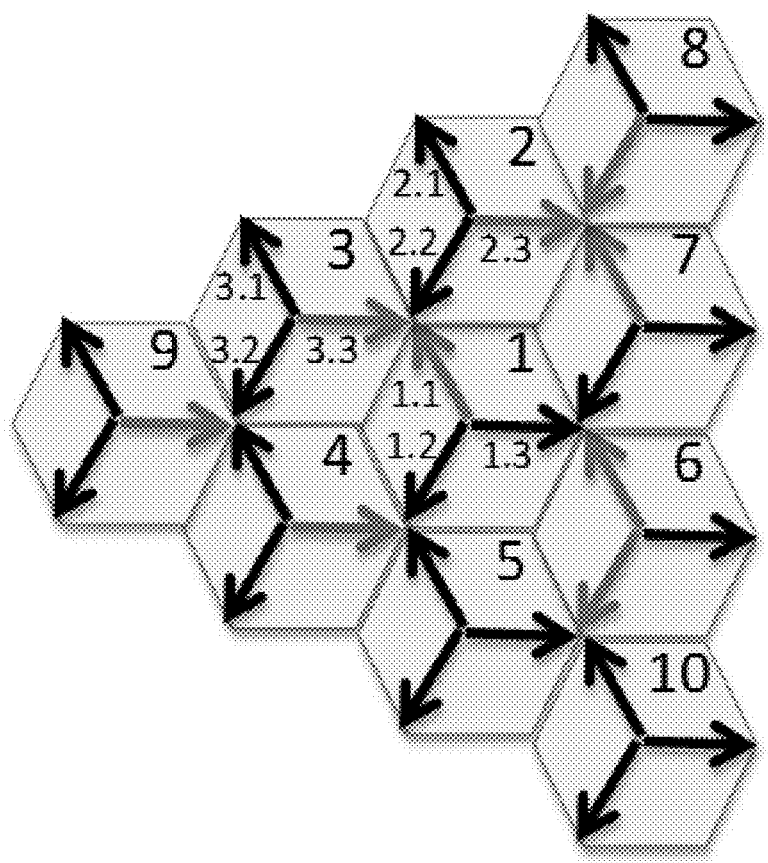
FIG. 10: A typical metropolitan cellular network cluster comprised of ten sites with each site having three cellular towers.

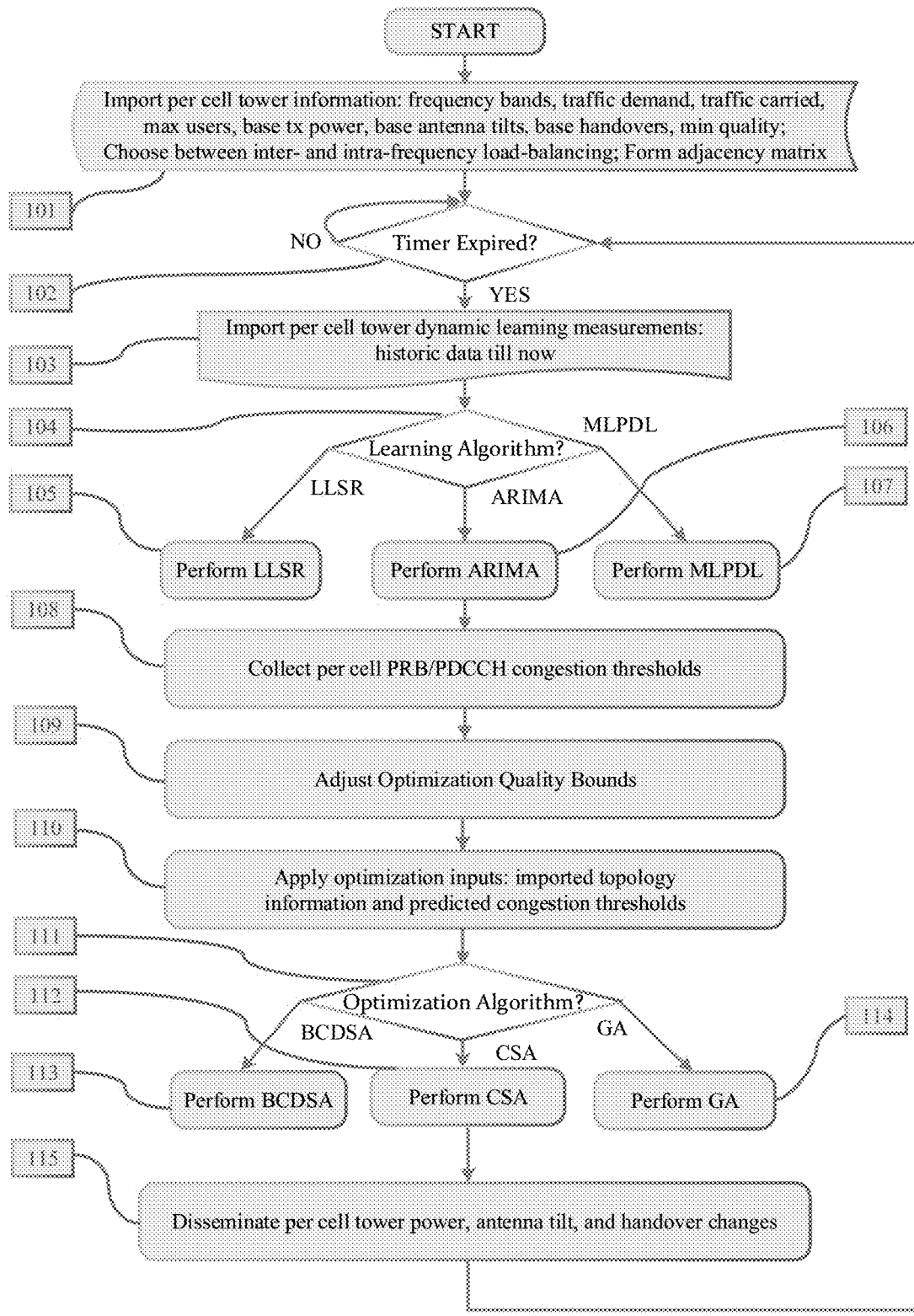
FIG. 11: An exemplary flowchart of the present invention.

AI-BASED LOAD BALANCING OF 5G CELLULAR NETWORKS

FIELD OF THE INVENTION

The present invention relates to methods, programs, and systems for balancing the load of 5G cellular networks by means of redistributing traffic from congested cellular towers to their non-congested neighboring cellular towers.

BACKGROUND OF THE INVENTION

Every year, mobile operators spend a significant portion of their operating budget on improving their cellular infrastructure. Different improvement and congestion mitigation approaches include spending major capital to acquire new spectrum, building new macro sites to add bandwidth, and building small cells as well as in-building solutions. These approaches have proven effective in certain cases but are expensive and not always practical when facing challenges associated with dynamic load demands. When facing dynamic load demands and in the absence practically viable systematic optimization approaches, mobile operators exercise manual fine-tuning of cellular network parameters in order to alleviate cellular congestion thereby properly handle dynamic load. However, the performance of these approaches are sub-par compared to those of systematic optimization approaches. This invention presents systematic approaches to optimally reduce the congestion thereby balance the load of 5G networks.

Under Next-generation Radio (NR) and Long Term Evolution Advanced (LTE-A) standards used in 5G cellular networks, each cellular tower has a fixed number of Physical Resource Blocks (PRBs) and or Packet Dedicated Control CHannel (PDCCH) resources defined in time and frequency. The number of resources required to achieve an acceptable level of Quality of Service (QoS) depends on the type of service and the RF channel quality between a User Equipment (UE) and the cellular tower to which the UE is connected. Depending on the bandwidth of a 5G channel, each cell offers a fixed number of PRBs and PDCCHs. For example, a 5 MHz channel offer no more than 25 and 50 PRBs. When the demand for PRB or PDCCH is higher than what a cell can offer, adverse impacts on UEs connected to the cell may be imposed. The impacts range from degrading the speed of existing connections, denying incoming handover requests, or even dropping calls in severe cases of congestion.

In order to mitigate the issue noted above, most operators attempt at keeping per cell PRB and PDCCH utilized capacity under a fixed congestion threshold. In most cases, the value of the threshold is set to a fixed number between 60% and 80% of the total capacity of cellular tower. The remaining reserved capacity of the cell can then be used to service handover requests and provide a safety margin to avoid denial of handover requests. Cells continually exceeding the congestion threshold usually trigger augmentation mechanisms such as carrier additions or bandwidth expansions. In an effort to keep PRB and PDCCH utilization under a threshold of congestion, it is critical to manage traffic amongst various cells where traffic from highly loaded cells is offloaded to lightly loaded cells serving the same area. This traffic offload can be achieved in several manners, i.e., by changing the footprint of cells, shifting cell boundaries, varying cell antenna tilts, and changing the azimuths of cells.

Generally speaking, implementing physical changes is time consuming and more suited for static or slowly changing environments as oppose to fast changing dynamic environments. Alternatively, this invention introduces changing the power and antenna tilt of a cell i referred to as $\wp_i$ and $\tau_i$, as well as the handover thresholds of a cell i to all its neighbor cells j referred to as $\hbar_i = \{\hbar_{i,1}, \ldots, \hbar_{i,j}, \ldots, \hbar_{i,i^F}\}$ in order to control the serving area of said cell and redistribute traffic as needed. These parameters can be changed in the field in response to dynamic traffic changes in order to offload excess traffic from congested cells to neighboring cells. Caution has to be exercised such that traffic offloading is done without congesting the neighboring cells and without degrading the quality of service for the shifted UEs below an acceptable level.

The phrases cell, cell tower, and cellular tower are used interchangeably in the disclosure of this invention. Further, the phrases breakpoint and the fixed congestion threshold are used interchangeably.

BRIEF SUMMARY OF THE INVENTION

The subject disclosure features a method that effectively predicts the average number of connected UEs associated with congestion threshold of either PRB or PDCCH utilization in 5G cellular towers and provides a dynamic automated solution that balances the load of 5G networks by redistributing traffic from congested cells to the non-congested cells automatically.

In an embodiment illustrated by FIG. 10, cellular network is a three-tiered network. The cellular network comprises clusters that comprise sites, and the sites comprise cellular towers. The cellular network may comprise one or more clusters of sites. The cluster may comprise a plurality of sites, for instance, ten sites. Each site may comprise a plurality of cellular towers, such as three cellular towers. Each cluster may comprise a plurality of cellular towers, for example, 200 cellular towers.

A further embodiment of the present invention comprises a Linear Least Square Regression (LLSR) machine learning technique that can be iteratively trained by real network measurement data collected from 5G cellular towers to accurately predict the average number of connected UEs associated with the congestion threshold of PRB or PDCCH utilization in cellular towers.

A further embodiment of the present invention comprises an Auto Regressive Integrated Moving Average (ARIMA) machine learning structure that can be iteratively trained by real network measurement data collected from 5G cellular towers to accurately predict the average number of connected UEs associated with the congestion threshold of PRB or PDCCH utilization in cellular towers.

A further embodiment of the present invention comprises a Multi-Layer Perceptron Deep Learning (MLPDL) structure that can be iteratively trained by real network measurement data collected from 5G cellular towers to accurately predict the average number of connected UEs associated with the congestion threshold of PRB or PDCCH utilization in cellular towers.

A further embodiment of the present invention comprises a detailed formulation of an optimization problem with the objective of minimizing the congestion of a collection of cellular towers beyond their predicted congestion threshold of PRB or PDCCH utilization through traffic offloading and subject to constraints associated with preserving the overall cluster load as well as minimum quality thresholds experienced by connected UEs.

Additional embodiments of the present invention feature solving this optimization problem using three algorithmic alternatives, namely, Constrained Simulated Annealing (CSA), Block Coordinated Descent Simulated Annealing (BCDSA), and Genetic Algorithm (GA).

In one embodiment, adjusting power, antenna tilt, or handover thresholds of individual cellular towers results in shifting cellular tower borders, redistributing traffic from congested cellular towers to non-congested cellular towers, and balancing the load.

In one embodiment, CSA algorithm described in Algorithm 1 provides an automatic iterative process to reduce congestion and balance the load of a 5G cellular network by applying changes to three sets of decision variables, i.e., power $\wp$, antenna tilt $\tau$, and handover threshold $\hbar$ of cellular towers.

In one preferred embodiment, BCDSA algorithm described in Algorithm 2 provides an automatic iterative process to reduce congestion and balance the load of a 5G cellular network by applying changes to three sets of decision variables, i.e., power $\wp$, antenna tilt $\tau$, and handover threshold $\hbar$ of cellular towers. In such embodiment, BCDSA algorithm applies changes to one set of decision variables at a time while keeping the other two sets fixed at that time. Then, it alternates among the sets of power, tilt, and handover decision variables based on freeze thresholds.

In another preferred embodiment, GA algorithm described in Algorithm 3 provides an automatic iterative process to reduce congestion and balance the load of a 5G cellular network by applying changes to three sets of decision variables, i.e., power $\wp$, antenna tilt $\tau$, and handover threshold $\hbar$ of cellular towers.

In an integrated embodiment illustrated by FIG. 11, the present invention features a method to reduce the congestion and balance the load of a 5G cellular network. The method may comprise:

- importing per cellular tower information (101) including frequency bands, base average transmit powers, base neighbor handovers, base antenna tilts, traffic demand, traffic carried, dropped call rate, throughput, accessibility rate, and minimum acceptable quality;
- choosing one or more operating frequency bands (101);
- if the chosen frequency band set includes more than one element, choosing between inter- or intra-frequency load balancing (101);
- forming a network adjacency matrix utilizing the imported per cellular tower information (101);
- waiting for the expiration of a refresh timer (102);
- importing additionally collected periodical measurements of cellular towers since the previous expiration of the refresh timer (103);
- choosing a learning algorithm (104) to predict per cell thresholds of congestion;
- if LLSR machine learning prediction algorithm is chosen, applying LLSR algorithm (105) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;
- if ARIMA machine learning prediction algorithm is chosen, applying ARIMA algorithm (106) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;
- if MLPDL prediction algorithm is chosen, applying MLPDL algorithm (107) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;
- collecting predicted PRB or PDCCH congestion thresholds (108) for use by the optimization algorithm;
- adjusting minimum acceptable quality bounds of the optimization (109) based on the variations of the imported information including dropped call rate, throughput, and accessibility rate;
- applying optimization inputs (110) including imported topology information and predicted PRB/PDCCH thresholds;
- choosing the optimization algorithm (111);
- if CSA optimization algorithm is chosen, performing CSA algorithm (112) to redistribute traffic as the result of changing power, antenna tilt, and handover thresholds of the plurality of cells to effectively redistribute traffic from congested cells to non-congested cells thereby optimally reducing the congestion and balancing the load of the cellular network;
- if BCDSA optimization algorithm is chosen, performing BCDSA algorithm (113) to redistribute traffic as the result of changing power, antenna tilt, and handover thresholds of the plurality of cells to effectively redistribute traffic from congested cells to non-congested cells thereby optimally reducing the congestion and balancing the load of the cellular network;
- if GA optimization algorithm is chosen, performing GA algorithm (114) to redistribute traffic as the result of changing power, antenna tilt, and handover thresholds of the plurality of cells to effectively redistribute traffic from congested cells to non-congested cells thereby optimally reducing the congestion and balancing the load of the cellular network;
- disseminating the changes to the operating parameters of cellular towers (115); and
- going back to step (102) to wait again for the expiration of said refresh timer.

In another integrated embodiment illustrated by FIG. 11, the present invention features a computer program product stored in a computer readable non-volatile and volatile storage medium. The computer program is capable of reducing congestion and balancing the load of a 5G cellular network. The computer program may comprise:

- code for importing per cellular tower information (101) including frequency bands, base average transmit powers, base neighbor handovers, base antenna tilts, traffic demand, traffic carried, dropped call rate, throughput, accessibility rate, and minimum acceptable quality;
- code for choosing one or more operating frequency bands (101);
- if the chosen frequency band set includes more than one element, code for choosing between inter- or intra-frequency load balancing (101);
- code for forming a network adjacency matrix utilizing the imported per cellular tower information (101);
- code for waiting for the expiration of a refresh timer (102);

code for importing additionally collected periodical measurements of cellular towers since the previous expiration of the refresh timer (103);

code for choosing a learning algorithm (104) to predict per cell thresholds of congestion;

if LLSR machine learning prediction algorithm is chosen, code for applying LLSR algorithm (105) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;

if ARIMA machine learning prediction algorithm is chosen, code for applying ARIMA algorithm (106) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;

if MLPDL prediction algorithm is chosen, code for applying MLPDL algorithm (107) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;

code for collecting predicted PRB or PDCCH congestion thresholds (108) for use by the optimization algorithm;

code for adjusting minimum acceptable quality bounds of the optimization (109) based on the variations of the imported information including dropped call rate, throughput, and accessibility rate;

code for applying optimization inputs (110) including imported topology information and predicted PRB/PDCCH thresholds;

code for choosing the optimization algorithm (111);

if CSA optimization algorithm is chosen, code for performing CSA algorithm (112) to redistribute traffic as the result of changing power, antenna tilt, and handover thresholds of the plurality of cells to effectively redistribute traffic from congested cells to non-congested cells thereby optimally reducing the congestion and balancing the load of the cellular network;

if BCDSA optimization algorithm is chosen, code for performing BCDSA algorithm (113) to redistribute traffic as the result of changing power, antenna tilt, and handover thresholds of the plurality of cells to effectively redistribute traffic from congested cells to non-congested cells thereby optimally reducing the congestion and balancing the load of the cellular network;

if GA optimization algorithm is chosen, code for performing GA algorithm (114) to redistribute traffic as the result of changing power, antenna tilt, and handover thresholds of the plurality of cells to effectively redistribute traffic from congested cells to non-congested cells thereby optimally reducing the congestion and balancing the load of the cellular network;

code for disseminating the changes to the operating parameters of cellular towers (115); and code for going back to step (102) to wait again for the expiration of said refresh timer.

In yet a further integrated embodiment illustrated by FIG. 11, the present invention features a system for reducing congestion and balancing the load of a 5G cellular network. The system may comprise a processor, and a memory coupled to the processor, the memory stores instructions readable by a computing device that, when executed by the processor, cause the processor to perform operations. The operations may comprise:

importing per cellular tower information (101) including frequency bands, base average transmit powers, base neighbor handovers, base antenna tilts, traffic demand, traffic carried, dropped call rate, throughput, accessibility rate, and minimum acceptable quality;

choosing one or more operating frequency bands (101);

if the chosen frequency band set includes more than one element, choosing between inter- or intra-frequency load balancing (101);

forming a network adjacency matrix utilizing the imported per cellular tower information (101);

waiting for the expiration of a refresh timer (102);

importing additionally collected periodical measurements of cellular towers since the previous expiration of the refresh timer (103);

choosing a learning algorithm (104) to predict per cell thresholds of congestion;

if LLSR machine learning prediction algorithm is chosen, applying LLSR algorithm (105) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;

if ARIMA machine learning prediction algorithm is chosen, applying ARIMA algorithm (106) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;

if MLPDL prediction algorithm is chosen, applying MLPDL algorithm (107) to predict congestion thresholds of the plurality of cellular towers one cellular tower at a time, wherein the congestion threshold of a cell tower reflects the average number of users connected to said cell tower associated with a preferred maximum PRB or PDCCH utilization of said cellular tower;

collecting predicted PRB or PDCCH congestion thresholds (108) for use by the optimization algorithm;

adjusting minimum acceptable quality bounds of the optimization (109) based on the variations of the imported information including dropped call rate, throughput, and accessibility rate;

applying optimization inputs (110) including imported topology information and predicted PRB/PDCCH thresholds;

choosing the optimization algorithm (111);

if CSA optimization algorithm is chosen, performing CSA algorithm (112) to redistribute traffic as the result of changing power, antenna tilt, and handover thresholds of the plurality of cells to effectively redistribute traffic from congested cells to non-congested cells thereby optimally reducing the congestion and balancing the load of the cellular network;

if BCDSA optimization algorithm is chosen, performing BCDSA algorithm (113) to redistribute traffic as the result of changing power, antenna tilt, and handover thresholds of the plurality of cells to effectively redistribute traffic from congested cells to non-congested cells thereby optimally reducing the congestion and balancing the load of the cellular network;

if GA optimization algorithm is chosen, performing GA algorithm (114) to redistribute traffic as the result of changing power, antenna tilt, and handover thresholds of the plurality of cells to effectively redistribute traffic from congested cells to non-congested cells thereby optimally reducing the congestion and balancing the load of the cellular network;

disseminating the changes to the operating parameters of cellular towers (115); and going back to step (102) to wait again for the expiration of said refresh timer.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE ALGORITHMS

Algorithm 1 contains an algorithmic description of CSA algorithm.

Algorithm 2 contains an algorithmic description of BCDSA algorithm.

Algorithm 3 contains an algorithmic description of GA algorithm.

BRIEF DESCRIPTION OF THE DRAWINGS

FIG. 1 shows sample drawings of PRB utilization as a function of average connected UEs.

FIG. 2 illustrates a sample fixed, fully connected, feed-forward perceptron MLPDL structure utilized for predicting the average number of connected UEs associated with PRB (or PDCCH) utilization congestion threshold of cellular towers.

FIG. 3 shows the impact of changing power of cell A on reducing cell A coverage radius.

FIG. 4 shows the impact of tilting down the antenna of cell A on reducing cell A coverage radius.

FIG. 5 shows the impact of tilting up the antenna of cell B on reducing cell A coverage radius.

FIG. 6 shows the impact of changing handover threshold of cell B on reducing cell A coverage radius.

FIG. 7 shows a flowchart illustrating the operation of GA algorithm.

FIG. 8 illustrates the crossover operator in GA algorithm.

FIG. 9 illustrates the mutation operator in GA algorithm.

FIG. 10 shows a typical metropolitan 5G cellular network cluster comprised of ten sites with each site having three cellular towers.

FIG. 11 shows an exemplary flowchart of the present invention.

DETAILED DESCRIPTION OF THE INVENTION

This invention focuses on systematically finding power, tilt, and handover settings of a cluster of 5G cells balancing the load of the overall cluster by means of minimizing its congestion. First, one of the available learning schemes, namely, LSSR, ARIMA, or MLPDL predicts the congestion threshold associated with PRB or PDCCH utilization of the plurality of cellular towers belonging to said cluster. Next, an optimization problem aiming at minimizing the congestion of said cluster is formulated using per cellular tower power, tilt, and handover parameters as decision variables. The problem is then solved using one of the three available optimization techniques, namely, CSA, BCDSA, or GA. Accordingly, integrated method, program, and system sets aiming at balancing the load of the cluster subject to load preservation and quality constraints are introduced.

In an embodiment of the presented load-balancing algorithms by means of congestion minimization, a 5G cellular network cluster illustrated in FIG. 10 is used. This embodiment represents a typical deployment of 5G cell towers in a major US metropolitan area. The cluster is comprised of ten sites with each site having three cellular towers covering hundred and twenty degrees and presented by arrows pointing at three different directions. For a given operation scenario, cells in red represent congested cells while cells in black represent non-congested cells.

In some embodiment, the present invention presents a solution to congestion minimization by first predicting the congestion thresholds of either PRB or PDCCH utilization of each cell tower as a function of connected UEs thereby avoiding degradation of neighboring cells' offered quality as the result of offloading users from congested cells. Utilizing the predicted congestion thresholds as operational constraints, optimal configurations of parameters $\wp_i$, $\tau_i$, and $\hbar_{i,j}$ with i, j∈{1, . . . , N} that maximize traffic offloading are identified for the plurality of cells within a cluster set. Said configuration parameters satisfy minimum quality thresholds of the plurality of cells and preserve cluster loading. Low complexity of the solutions allow them to be embedded into live systems making real time decisions about traffic offloading. Hence, offered solutions can operate as intelligent Self Optimizing Network (iSON) systems.

Table 1 provides a listing of notations used in this invention disclosure.

TABLE 1

Table of notations used in this invention disclosure.

| | |
|---|---|
| I | Set of all 5G cells within cluster |
| i | 5G cell index within set I |
| N | The number of cells within set I |
| $\wp_i$ | Power of cell i |
| $\tau_i$ | Antenna tilt of cell i |
| $\hbar_{i,j}$ | Handover margins of cell i to its neighbor j |
| $x_i$ | Ordered triplet setting ($\wp_i$, $\tau_i$, ( $\hbar_{i,1}$, . . . , $\hbar_{i,N}$) for cell i |
| $\underline{x}$ | Vector of elements $x_i$ where i ∈ {1, . . . ,N} |
| $\lambda_i$ | Average connected UEs to cell i |
| $\lambda_i^\wp$ | UE offload of cell i due to power change |
| $\lambda_i^\tau$ | UE offload of cell i due to antenna tilt change |
| $\eta_{i,j}$ | Overlap percentage between cell i and its neighbor j |
| $q_i$ | Quality of service experienced by a UE connected to cell i |
| Q | Minimum acceptable quality of a UE |
| $\gamma_i$ | Received SINR of a UE connected to cell i |
| $\delta_i$ | Penalty of violating cell i quality and connected UE constraints |
| $\lambda_{i,j}^\hbar$ | UE offload from cell i to cell j due to handover threshold change |
| $\Lambda_i$ | Average number of UEs connected to cell i associated with threshold of congestion of PRB or PDCCH utilization |
| $\Lambda_L$ | Overall cluster load measured as total number of average UEs connected to all cells of set I |
| $\Lambda_\gamma$ | Total congestion of cluster measured as $\Sigma_{i \in I}(\lambda_i - \Lambda_i)$ |
| $\tilde{\Lambda}_\gamma$ | Penalty-augmented $\Lambda_\gamma$ due to violating all per cell quality constraints |
| $\xi$ | Freeze count measure of BCDSA and CSA algorithms |
| $\xi_{max}$ | Maximum freeze count measure of BCDSA and CSA |

TABLE 1-continued

Table of notations used in this invention disclosure.

| | |
|---|---|
| | algorithms |
| m | Number of search attempts in BCDSA and CSA algorithms |
| T | Temperature of BCDSA and CSA algorithms |
| $T_i$ | Initial temperature of BCDSA and CSA algorithms |
| $T_f$ | Final temperature of BCDSA and CSA algorithms |
| a | Cooling factor of BCDSA and CSA algorithms |
| ρ | Multiplier of N controlling the number of iterations at each temperature point of BCDSA and CSA algorithms |
| σ | Number of times the temperature will be cooled down in BCDSA and CSA algorithms |
| B | Boltzman constant |
| n | Initial population count for GA algorithm |
| χ | Fixed real number multiplier for GA algorithm depending on the number and variation ranges of decision variables |
| ε | Small number used in the stoppage criterion of GA algorithm |
| R | Random number derived from uniform distribution U [0, 1] |
| U | Unit step function |

Learning-Based Breakpoint Modeling

First, the approaches to learning congestion thresholds of PRB and PDCCH utilization in each 5G cell i in a cluster of cellular towers is discussed. Denoted by $\Lambda_i$, the average number of UEs connected to cell i associated with the congestion threshold of PRB or PDCCH utilization is predicted. FIG. 1 shows sample drawings of actual PRB or PDCCH utilization of different cells as a function of average connected users collected from a major mobile operator data over one month in downtown Los Angeles. Inspecting the graphs, it is evident that each cell has its own utilization characteristic under different loading levels of average connected users. The question to be answered is then how to predict the value of $\Lambda_i$, i.e., the average number of connected UEs crossing the congestion threshold of each cell i based on its unique characteristics. In what follows 3 different approaches are discussed.

For all 3 approaches, a critical factor in generating accurately predicted results is the choice of input dataset representing utilized cellular counters. The goal is to utilize a group of available 5G counters that are most closely related to PRB and PDCCH utilization of cells. In a number of embodiments, various counters collected from the real network of two major US mobile operators over two weeks are investigated. Among the set of input data, some of these counter are average and peak connected UEs, PRB utilization, PDCCH utilization, QCI, modulation scheme used, average and peak throughputs of UEs as well as cells, uplink SINR, CQI, spectral efficiency, average Receive reference Signal on Reference Power (RSRP), and Reference Signal Received Quality (RSRQ).

Linear Least Square Regression Machine Learning

In an embodiment, linear least squares regression is used to predict congestion thresholds of individual cells in a cluster of cell towers. In LLSR, the conditional mean of utilization given the average number of connected UEs is assumed to be an affine function of those values. Linear least square regression focuses on the conditional probability distribution of the utilization given average number of connected UEs, rather than on the joint probability distribution of all of these variables. In this embodiment, the relationships between PRB or PDCCH utilization and the average number of connected UEs is modeled using linear predictor functions whose unknown model parameters are estimated from the collected data. In essence, LLSR is used to to fit a predictive linear model to the observed data set of the average number of connected UEs (x-axis) and PRB or PDCCH utilization (y-axis). In LLSR, the relationship between the average number of connected UEs and PRB or PDCCH utilization is assumed linear and least squares is the method used to find the best fit line for the collected dataset. LLSR creates a straight line that minimizes the sum of squares of the errors generated from the differences in the observed values and the values predicted by the model. After developing the model, i.e.,specifying the line, the value of $\Lambda_i$ for each cell i, i.e., the average number of connected UEs crossing the congestion threshold is identified as the x-coordinate of the crossing point of the model line and the horizontal line corresponding to the value of congestion threshold.

Auto Regressive Integrated Moving Average Machine Learning

In another embodiment, autoregressive integrated moving average is used to predict congestion thresholds of individual cells in a cluster of cell towers. ARIMA model is a generalization of an autoregressive moving average model in which utilization and average number of connected UEs data are fitted to predict future points in the series. ARIMA models is applied particularly because utilization and average connected UE data show evidence of non-stationarity but an initial differencing step corresponding to the integrated part of the model can be applied one or more times to eliminate non-stationarity.

The AR part of ARIMA indicates that the evolving variable of interest is regressed on its own lagged values. The MA part indicates that the regression error is actually a linear combination of error terms whose values occurred contemporaneously and at various times in the past. The I indicates that the data values have been replaced with the difference between their values and the previous values and that this differencing process may have been performed more than once. The purpose of each of these features is to make the model fit the data as well as possible. The ARIMA model used is then denoted as ARIMA (p, d, q) where parameters p, d, and q are non-negative integers, p is the order (number of time lags) of the autoregressive model, d is the degree of differencing (the number of times the data have had past values subtracted), and q is the order of the moving-average model. Experimentally speaking, setting the values of p, d, q in the range of [1, 3] yields reasonable results in predicting the values of $\Lambda_i$ for each cell i, i.e., the average number of connected UEs crossing the congestion threshold.

Multi Layer Perceptron Deep Learning

In yet another embodiment, MLPDL is used to predict congestion threshold of individual cells in a cluster of cell towers. The latter is equivalent to identifying the value of $\Lambda_i$ for each cell i, i.e., the average number of connected UEs crossing the congestion threshold of PRB or PDCCH utilization. In this embodiment, a fixed, fully connected, feedforward perceptron learning structure is utilized for the task of congestion threshold modeling. Such structure consists of an input layer with 19 to 26 processing elements to accept up to 26 5G input dataset measurements. In order to strike the balance between accuracy and complexity, the structure considers two to four hidden layers, each layer containing ten to twenty processing elements. The structure has an output layer with one processing element predicting the value of $\Lambda_i$ for cell i. FIG. 2 illustrates the MLPDL structure used for the task of learning.

In each iteration of learning, all inputs associated with a sample input are propagated in the forward direction from the input through hidden layers to generate an output. The output value is compared to the measured output and an output error is calculated. The output error is then propagated in the reverse direction to the input layer in order to adjust weighting functions between every pair of processing elements in adjacent layers. The process is repeated until reaching an acceptable threshold of output error. For evaluating the error, Root Mean Square Error (RMSE) is calculated between the measured congestion threshold of PRB or PDCCH utilization from the collected data and MLPDL prediction.

Congestion Minimization

In additional embodiments, predicted congestion thresholds, i.e., breakpoints, are utilized in an optimization problem aiming to optimally balance the load of a cluster of cellular towers by means of shifting traffic from congested cells to their non-congested neighboring cells subject to experienced user quality. Shifting traffic can be done in three ways. First, reducing power $\wp_i$ of a cell i results in shrinking its footprint hence shifting UEs on the border to the neighboring cells. Second, changing cell antenna tilt $\tau_i$ down can also result in shrinking the footprint of the cell hence shifting UEs on the border to the neighboring cells Third, artificially changing the handover threshold $\hbar_{i,j}$ of cell i to a neighboring cell j results in making the neighboring cell look stronger thereby triggering an earlier handover. The latter effectively shrinks the footprint of cell i and shifts border UEs from cell i to cell j. However, traffic offloading has to be controlled to assure the volume of shifted traffic to a neighboring cell keeps the overall load of that neighboring cell below its threshold of congestion.

Hence, the problem aims at identifying the optimal settings of the operating parameters of each cell power $\wp_i$, antenna tilt $\tau_i$, and handover thresholds $\hbar_{i,j}$ in order to minimize the congestion of the cluster of cell towers as the result of shifting traffic from congested cells to their non congested neighbors. This is achieved subject to satisfying two constraints associated with the minimum acceptable quality experienced by a UE connected to a cell tower and preservation of the overall load of the cluster of cell towers.

Problem Description

The embodiment of interest attempts at minimizing the cluster congestion by offloading UEs connected to congested cells (i.e., those experiencing PRB or PDCCH utilization over their threshold of congestion) to non-congested neighboring cells without congesting neighboring cells. While any choice of congestion threshold may be considered in different embodiments, a value in the range of [60%, 80%] utilization is typical depending on the operating frequency.

The approach calls for a) reducing $\wp_i$ power of a congested cell i in order to shrink its footprint and hence shifting traffic to its neighbors, b) changing $\tau_i$ antenna tilt of a congested cell i down in order to shrink its footprint and hence shifting traffic to its neighbors, and c) changing the handover thresholds $\hbar_{i,j}$ of a non-congested neighboring cell j in order to increase the footprint of cell j. All changes result in shifting existing connected UEs on cell i edges to be served by its neighboring cells at a slightly lower quality than the quality experienced when connected to the original cell i. The quality experienced by a UE connected to cell i is typically represented by SINR and denoted as $q_i$.

FIG. 3 illustrates the received signal strength at a mobile user as the user moves from the vicinity of cell tower A to that of cellular tower B. The x-axis is the distance of the user from cell tower A to which the user is initially connected, while the y-axis is the user's received power. In FIG. 3, the blue line labeled A shows that the user's received signal strength from cell A decreases as the distance increases, i.e., as the user travels away from cell A. The green line labeled B shows the user's received signal strength from cell B increases as the distance increases, i.e., as the user travels toward cell B. The intersection point of blue and green lines represents the initial boundary distance point at which the user is handed over from cell A to cell B. The red line labeled A' shows reducing the value of cell power $\wp_A$ by a sample value of 3 dB shrinks the footprint of cell A from $r_A$ to $r_{A''}$. The reduction in cell power shifts the intersection point to the left causing the handover to occur at a shorter distance from cell A where red line and green line cross. This means that the cell radius of cell A and hence footprint has shrunk and UEs have been shifted to cell B.

Further, FIG. 4 shows the decrease in the footprint of cell A from $r_A$ to $r_{A'}$ as the result of tilting down the antenna of cell A, $\tau_A$. Downtilting $\tau_A$ from a degrees to a' degrees shifts the original intersection point of the blue line labeled A and the green line labeled B up to occur at a shorter distance from cell A where the red line labeled A' and the green line labeled B cross. This means that the radius of cell A and hence its footprint have shrunk and UEs have been shifted to cell B.

Similarly, FIG. 5 shows the increase in the footprint of cell B from $r_B$ to $r_{B'}$ as the result of tilting up the antenna of cell B, $\tau_B$. Uptilting $\tau_B$ from b degrees to b' degrees shifts the original intersection point of the blue line labeled A and the green line labeled B up to occur at a shorter distance from cell A where the blue line labeled A and the red line labeled B' cross. This means that the radius of cell A and hence its footprint have shrunk and UEs have been shifted to cell B.

Finally, FIG. 6 shows the increase in the footprint of cell B from $r_B$ to $r_{B'}$ as the result of increasing the value of handover threshold $\hbar_{A,B}$. Increasing $\hbar_{A,B}$ by a sample value of 3 dB shifts the original intersection point of the blue line labeled A and the green line labeled B to the left and causes the handover point to occur at a shorter distance from cell A where the blue line labeled A and the red line labeled B' cross. Again, this means that the radius of cell A and hence its footprint have shrunk and UEs have been shifted to cell B.

Problem Formulation

In an embodiment of the invention, the formulated optimization problem is expressed as shown below where $[x]^+ = \max(x, 0)$.

$$\min_{\forall \wp_i, \tau_i, \hbar_{i,j}} \Lambda_Y = \sum_{i \in I} \left[ \left( \lambda_i + \lambda_i^\wp + \lambda_i^\tau + \sum_{\substack{j \in I \\ i \neq j}} \lambda_{i,j}^\hbar \right) - \Lambda_i \right]^+ \quad (1)$$

$$\text{S.T.} \sum_{i \in I} \left[ \lambda_i + \lambda_i^\wp + \lambda_i^\tau + \sum_{\substack{j \in I \\ i \neq j}} \lambda_{i,j}^\hbar \right] = \Lambda_L \quad (2)$$

$$q_i \geq Q, \ \forall i \in I \quad (3)$$

The formulation attempts at minimizing $\Lambda_Y$ the total cluster congestion by changing power $\wp_i$, antenna tilt $\tau_i$, and handover thresholds $\hbar_{i,j}$ on a cell-by-cell basis. The optimization cost function is subject to two constraints. First, the total number of UEs connected to all cells has to sum up to the total load of the cluster. This constraint in essence guarantees the preservation of load within the cluster. Second, the quality experienced by a UE connected to cell i denoted by $q_i$ has to meet a minimum acceptable quality threshold of Q explained shortly. The total traffic congestion $\Lambda_Y$ in Eq. (1) is the difference of the summation of four terms and predicted congestion threshold associated with all individual cells. These terms for cell i are the current UEs connected to cell i, the change in connected UEs associated with changing power $\lambda_i\wp$, the change in connected UEs associated with changing antenna tilt $\tau_i$, and the sum of changes in connected UEs associated with offloading users from cell i to neighboring cells j after changing handover threshold values from cell i to cell j, $\lambda_{i,j}\hbar$. Finally, $\Lambda_i$ represents the predicted congestion threshold of cell i.

In the embodiment above, the optimization problem represents a nonlinear programming problem decision variables $\wp_i$, $\tau_i$, and $\hbar_{i,j}$ where i, j∈{1 ..., N} and decision variables assume values from discrete sets. Next, a mathematical analysis defining individual terms of the optimization problem is provided.

The change in connected UEs associated with $\lambda_i\wp$ represents traffic offload to the neighboring cells as the result of shrinking the footprint of cell i after changing $\wp_i$. Accordingly, $\lambda_i\wp$ is expressed by Eq. (4).

$$\lambda_i^\wp = \lambda_i\left[1 - \left(10^{\frac{-\Delta\wp_i}{K_2}}\right)^2\right] \quad (4)$$

In the equation above, $K_2$ is a constant with typical values of −40, −30, and −20 dB/decade for urban, suburban, and rural environments, respectively. It has to be noted that Eq. (4) is derived utilizing Hata propagation model [18,19] and assuming the traffic is homogeneously distributed in the serving area as depicted in [20,21].

The change in connected UEs associated with $\lambda_i^\tau$ represents traffic offload to the neighboring cells as the result of shrinking the footprint of cell i after downtilting $\tau_i$. It is expressed as a function of the traffic offload of cell i to its neighbor j and the area overlap percentage $\eta_{i,j}$ between cells i and j. Accordingly, $\lambda_i^\tau$ is expressed by Eq. (6).

$$\lambda_i^\tau = \eta_{i,j}\lambda_i\left[1 - \left(\frac{\tan a}{\tan a'}\right)^2\right] \quad (5)$$

It has to be noted that Eq. (6) is derived utilizing basic geometry in FIG. 4 and the following assumptions. First, traffic is homogeneously distributed in the serving area as depicted in [20,21]. Second, the vertical distance is not significant compared to horizontal distance. In the equation above, the angles a and a' are specified in FIG. 4.

A similar expression captures an increase in the footprint of a non congested cell as the result of uptilting its antenna. In the equation above, the angles b and b' are specified in FIG. 5.

$$\lambda_i^\tau = \eta_{i,j}\lambda_i\left[1 - \left(\frac{\tan b'}{\tan b}\right)^2\right] \quad (6)$$

Finally, $\lambda_{i,j}\hbar$ is epressed as a function of the traffic offload of cell i to its neighbor j and the area overlap percentage $\eta_{i,j}$ between cells i and j.

$$\lambda_{i,j}^\hbar = \eta_{i,j}\lambda_i\left[1 - \left(10^{\frac{-\Delta\hbar_{i,j}}{K_2}}\right)^2\right] \quad (7)$$

While the overlap percentage can be calculated from handover statistics on a cell pair basis, $\eta_{i,j}$ is set separately for front facing and co-site neighbors. To understand the definitions of front facing and co-site neighbors, note that in FIG. 10 cell 1.1 has front facing neighbors 2.2 and 3.3, and co-site neighbors 1.2 and 1.3.

Next, quality constraints are discussed. The average quality $q_i$ of cell i after applying new settings is presented as shown below.

$$q_i = \min_j q_{i,j} \quad (8)$$

The impact to quality is mainly associated with the shift of cell boundaries due to $\Delta\wp_i$, $\Delta\tau_i$, $\Delta\hbar_{i,j}$, or the sum of them combined. The combined effect results in shifting users at the edge of cell i to a neighboring cell j where they are served by a weaker signal and with a slightly degraded quality level. This shift is calculated for each serving cell i and each of its neighbors j. The worst quality value $q_{i,j}$ is chosen to present the quality of cell i guaranteed not to be less than a minimum allowed quality level of Q.

In order to express $q_{i,j}$ as a function of $\Delta\wp_i$, $\Delta\tau_i$, and $\Delta\hbar_{i,j}$, $\gamma_i$ representing the SINR of a UE connected to cell i is chosen as the quality metric [18,22]. When reducing the serving cell i power $\wp_i$ or downtilting its antenna $\tau_i$, the boundary of cell i shrinks forcing the UEs at $r_A$ to be served at a lower quality by a neighboring cell. In environments of interest to this invention, the UEs at the boundary of the serving cell typically experience a reduction of $q_i$ equivalent to the reduction in power $\wp_i$, $\tau_i$ and handover threshold $\hbar_{i,j}$. Hence, the variations in quality of a UE shifted from cell i to a neighboring cell j is expressed as shown below.

$$\Delta\gamma_{i,j} = \Delta\wp_i + \Delta\tau_i + \Delta\hbar_{i,j} \quad (9)$$

Consequently, the quality impact is captured as shown below.

$$q_{i,j} = \gamma_{i,j} - \Delta\gamma_{i,j} \quad (10)$$

In a typical embodiment of interest to this invention, UEs at a cell boundary experience a reference SINR value of zero dB. Further, a minimum SINR value of −3 dB is needed in order to support a minimum modulation scheme of QPSK for covered UEs [18, 23]. Therefore, Q is set to −3 dB.

Solution Approach

Considering the fact that the formulated problem is a nonlinear optimization problem in which decision variables assume discrete values, three algorithmic embodiments namely CSA, BCDSA, and GA are presented to solve the problem after adding a set of penalty terms $\mathcal{U}_i$ and $\delta_i$ to the objective function [24-26]. Penalty terms are added in order to enforce quality constraints. The penalty-augmented objective function is then defined below.

$$\Lambda_\Upsilon = \sum_{i\in I}\left\{\left[\left(\lambda_i + \lambda_i^\wp + \lambda_i^\tau + \sum_{\substack{j\in I\\i\neq j}}\lambda_{i,j}^\hbar\right) - \Lambda_i\right]^+ + 10^6 * \delta_i + 10^6 * \mathcal{U}_i\right\} \quad (11)$$

In Eq. (11), $$\delta_i = \begin{cases} 1, & \text{if } \left(\sum_{i\in I}\left[\lambda_i + \lambda_i^\wp + \lambda_i^\tau + \sum_{\substack{j\in I\\i\neq j}}\lambda_{i,j}^\hbar\right] \neq \Lambda_L\right) \text{ and} \\ 0, & \text{Otherwise} \end{cases} \quad (12)$$

-continued $$\mathcal{U}_i = \begin{cases} 1, & \text{if } (q_i < Q) \\ 0, & \text{Otherwise} \end{cases} \quad (13)$$

It has to be noted that $\delta_i$ is a weighted penalty factor applying a constant large hard penalty, set to $10^6$ in one embodiment, for violating the load preservation constraint in equation (2) of cell i. Further, $\mathcal{U}_i$ is a weighted penalty factor applying a constant large hard penalty, set to $10^6$ in one embodiment, for violating the quality constraint in equation (3). Numerically, the load preservation constraint in equation (2) is met by balancing the offloading of connected UEs from a congested cell to its neighbors.

Constrained Simulated Annealing (CSA)

In the first algorithmic embodiment, the SA algorithm is described. The SA algorithm seeks to emulate the annealing process in which a solid material already heated up to high temperatures is allowed to slowly cool until it crystallizes. As the temperature is reduced, the energy of the material decreases until a state of minimum energy is achieved. An SA algorithm begins at high temperature values where input values are allowed to have a great range of variations. As the algorithm progresses, temperature is allowed to fall while restricting input variations. This leads the algorithm to improve its current solution similar to the actual annealing process. As long as temperature is being decreased, input variations lead to successively improved solutions and eventually reaching an an optimal set of input values when temperature is close to zero.

In the minimization problem, a change in the configuration of the system with three sets of per cell decision variables, namely, $\Delta\wp_i$, $\Delta\tau_i$, and $\Delta\hbar_{i,j}$ at temperature T is acceptable if the objective function is decreased ($\Delta\tilde{\Lambda}_\gamma < 0$) or otherwise ($\Delta\tilde{\Lambda}_\gamma > 0$) may be accepted if the Boltzmann condition below is met.

$$\exp(\tilde{\Lambda}_\gamma / BT) > R \quad (14)$$

In the inequality above, R is a random number derived from the uniform distribution U [0, 1], T is the temperature, and B is the Boltzmann constant set to one. Additionally, the cooling factor follows a geometric distribution in which the new temperature is the product of the previous temperature and a number smaller than 1. From (14), it is apparent that the probability of accepting non-improving changes depends on both the temperature which is the control parameter and the change in the objective function.

Cluster congestion is minimized without either exceeding the congestion threshold of each cell $C_i$ or degrading the quality below the minimum quality threshold Q. The maximum traffic allowed $C_i$ is predicted by the learning algorithms described before, while the minimum quality Q allowed for individual cell is specified based on certain Radio Access Bearers (RABs) requirements.

With respect to convergence, it is noted that the CSA algorithm is primarily an SA algorithm and hence the choices of parameters warrant its convergence to a local optimal point.

The CSA algorithm is illustrated in Algorithm 1.

Block Coordinated Descent Simulated Annealing (BCDSA)

Inspired by the block coordinated descent optimization techniques [27-29], the second algorithmic embodiment modifies the standard Simulated Annealing (SA) algorithm in an attempt to address the tradeoff between accuracy and complexity. Referred to as BCDSA algorithm, this algorithmic variation applies the SA algorithm to a partitioned set of decision variables, i.e., optimizing one set while keeping the other sets fixed at a time, and then alternating in order among the three sets. Alternating among three sets of decision variables occurs if the cost function does not change after few iterations of one set measured by a freeze factor $\xi$. There are three sets of per cell decision variables, namely, $\Delta\wp_i$, $\Delta\tau_i$, and $\Delta\hbar_{i,j}$. Accordingly, the partitioning strategy splits the decision variables to three sets, namely the set of $\Delta\wp_i$, $\Delta\tau_i$, and the set of $\Delta\hbar_{i,j}$ values.

With respect to convergence, it is noted that the BCDSA algorithm is primarily an SA algorithm augmented by BCD techniques and hence the choices of parameters warrant its convergence to a local optimal point. The effect of BCD augmentation is in essence improving its average speed and robustness of convergence.

The BCDSA algorithm is explained in Algorithm 2.

Genetic Algorithm (GA)

The third algorithmic embodiment of this invention, GA, is driven from the natural evolution of creatures, with the survival of the fittest, and creates child generations that are usually better than parents. FIG. 7 summarizes the operation of the GA algorithm [31]. In an embodiment of applying GA to the optimization problem of this invention, the number of genes is set to $N^2 + 2N$ presenting the plurality of operating parameters power $\wp_i$, $\tau_i$, and handover margin $\hbar_{i,j}$ of N cells. Having experimented with different embodiments, it is noted that the larger the initial population size, the better the chance of reaching the global minimum. However, choosing larger population sizes comes at the expense of longer runtimes.

One of the commonly used GA operators is Selection. Applying Selection operator results in choosing a certain percentage of top ranked chromosomes with the highest utility values as parents of the next generation. In an embodiment, a top rank percentage of 2% is used. Another operator, Crossover, is used to combine two chromosomes to create a new chromosome. This is done under the assumption that combining higher fitness chromosomes could result in even better fitting chromosomes thereby improving the overall fitness of a generation. In Crossover, a pair of chromosomes are selected to create offsprings. As illustrated by FIG. 8, offspring chromosomes are in essence a mix of parents in which a portion of genes are chosen from the first chromosome and the remaining from the second chromosome. The new population is ranked again in order to keep its top chromosomes and discard the rest. The last GA operator used is Mutation. As illustrated by FIG. 9, a random chromosome is chosen and the value of a number of its genes are changed. This operator allows the GA algorithm to jump to unexplored areas of the solution space that may have never been explored by other operators or would have taken a much longer time to converge to. Hence, it could help the algorithm escape local optima. Similar to the case of other operators, chromosomes with highest fitness are kept in the population count and the rest are discarded after applying Mutation operator.

With respect to convergence, it is noted that the GA algorithm is fairly robust but is slower than CSA and BCDSA algorithms.

Algorithm 3 describes how the GA algorithm is applied to solve the optimization problem of interest to this invention.

Alterations, Modifications, and Clarifications

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

In some embodiments described herein using the phrase "comprising" includes embodiments that could be described as "consisting of", and as such the written description requirement for claiming one or more embodiments of the present invention using the phrase "consisting of" is met.

Reference numbers cited in the claims are exemplary, for ease of review by the patent office only, and are not limiting in any way.

Figures are representatives of concepts only and the claims are not limited by the figures in any ways.

PATENT CITATIONS

[1] U.S. Ser. No. 10/362,520 Congestion reduction of LTE networks.
[2] U.S. Ser. No. 10/217,060 Capacity augmentation of 3G cellular networks: a deep learning approach.
[3] U.S. Ser. No. 10/405,193 Dynamic radio access network and intelligent service delivery for multi-carrier access for 5G or other next generation network.
[4] U.S. Ser. No. 10/237,041 Method and apparatus for self-configuration and self-optimization in a wireless communication system.
[5] U.S. Ser. No. 10/425,900 System and method for wireless power control.
[6] U.S. Ser. No. 10/420,027 Multiband power save control for wireless networking.
[7] U.S. Ser. No. 10/425,903 Method and apparatus for mitigating interference.
[8] U.S. Ser. No. 10/425,860 System and method for value optimized mobile networks.
[9] U.S. Pat. No. 10,341,891 User equipment adaptation of reporting triggers based on active set size.
[10] U.S. Pat. No. 9,973,993 System and method for programmable joint optimization of mobility load balancing and mobility robustness optimization.
[11] U.S. Pat. No. 9,942,819 System and method for group based handover parameter optimization for wireless radio access network load balancing.
[12] U.S. Pat. No. 9,578,607 Radio communication system, radio station, and method for controlling transmission power.
[13] U.S. Pat. No. 9,578,547 System, device, and method of media delivery optimization.
[14] U.S. Pat. No. 9,357,428 Enhanced self-organizing network switching matrix.
[15] U.S. Pat. No. 9,148,744 Network data optimization.
[16] U.S. Pat. No. 78,964,549 Method and apparatus for managing wireless communication based on network traffic level.
[17] U.S. Pat. No. 8,495,207 Network system for policing resource intensive behaviors.

NON-PATENT CITATIONS

[18] M. Ayman, S. El-Nashar, M. A. El-Saidny, *DESIGN, DEPLOYMENT AND PERFORMANCE OF 4G-LTE NETWORKS*. John Wiley & Sons, 2014.
[19] A. H. A. Meciej J Nawrocki, Mischa Dohler, *Understanding UMTS Radio Network Modeling, Planning and Automated Optimisation*. John Wiley & Sons, 2006.
[20] A. F. C. Hurtado. (2005, October) Umts capacity simulation study, master of science in telematics thesis.
[21] I. Siomina and S. Wanstedt, "The impact of qos support on the end user satisfaction in lte networks with mixed traffic," in 2008 *IEEE 19th International Symposium on Personal, Indoor and Mobile Radio Communications*, September 2008, pp. 1-5.
[22] L. Song and J. Shen, *Evolved Cellular Network Planning and Optimization for UMTS and LTE*. Taylor and Francis Group, L L C, 2011.
[23] M. B. Stefania Sesia, Issam Toufik, *LTE—The UMTS Long Term Evolution*. John Wiley & Sons, 2011.
[24] I. Necoara, "A random coordinate descent method for large-scale resource allocation problems," in *Decision and Control (CDC), 2012 IEEE 51st Annual Conference on*, December 2012, pp. 4474-4479.

[25] B. Wah, Y. Chen, and A. Wan, "Constrained global optimization by constraint partitioning and simulated annealing," in *Tools with Artificial Intelligence, 2006. ICTAI '06. 18th IEEE International Conference on*, November 2006, pp. 265-274.

[26] Y. Cui, K. Xu, J. Wu, Z. Yu, and Y. Zhao, "Multi-constrained routing based on simulated annealing," in *Communications, 2003. ICC '03. IEEE International Conference on*, vol. 3, May 2003, pp. 1718-1722 vol. 3.

[27] H. Yousefi'zadeh, A. Habibi, X. Li, H. Jafarkhani, and C. Bauer, "A statistical study of loss-delay tradeoff for red queues," *Communications, IEEE Transactions on*, vol. 60, number 7, pp. 1966-1974, July 2012.

[28] Y. T. Lee and A. Sidford, "Efficient accelerated coordinate descent methods and faster algorithms for solving linear systems," in *Foundations of Computer Science (FOCS), 2013 IEEE 54th Annual Symposium on*, October 2013, pp. 147-156.

[29] R. Qi and S. Zhou, "Simulated annealing partitioning: An algorithm for optimizing grouping in cancer data," in *Data Mining Workshops (ICDMW), 2013 IEEE 13th International Conference on*, December 2013, pp. 281-286.

[30] S. N. Sivanandam and. S. N. Deepa, *Introduction to Genetic Algorithms*. Springer, 2008.

[31] A. Chiumento, C. Blanch, C. Desset, S. Polling, L. V. der Perre, and R. Lauwereins, "Multi-objective genetic algorithm downlink resource allocation in lte: Exploiting the cell-edge vs. cell-center trade-off," in *2014 IEEE 21st Symposium on Communications and Vehicular Technology in the Benelux (SCVT)*, November 2014, pp. 116-120.

The invention claimed is:

1. A method of redistributing traffic from congested cellular towers to non-congested cellular towers in a Fifth Generation (5G) cellular network for balancing the load of said cellular network wherein said cellular network comprises clusters, clusters comprise sites, and sites comprise cellular towers, and wherein the method comprises: a. importing per cellular tower information at least comprising frequency band, average transmit power, neighbor handover, antenna tilt, traffic demand, traffic carried, dropped call rate, throughput, accessibility rate, and minimum acceptable quality; b. choosing a prediction algorithm; c. choosing an optimization algorithm; d. choosing one or more operating frequency bands; e. if the choice of step d includes more than one frequency band, choosing between inter- or intra-frequency load balancing; f. forming a network adjacency matrix utilizing the neighbor handover information of step a along with the choices of step d and step e; g. waiting for the expiration of a refresh timer; h. importing additionally collected periodical measurements of cellular towers of step a since the previous expiration of the refresh timer of step g; i. applying the algorithm chosen in step b to predict congestion thresholds of the plurality of cellular towers one cellular tower at a time, wherein the congestion threshold of a cell tower reflects the average number of users connected to said cell tower associated with a preferred maximum utilization of said cellular tower; j. adjusting minimum acceptable quality bounds of the optimization based on the variations of the imported information of step a; k. setting optimization inputs comprising imported information of step a, predicted congestion thresholds of step i, and minimum acceptable quality bounds of step j; l. applying the optimization algorithm chosen in step c to redistribute traffic as the result of changing operating parameters of the plurality of both congested and non-congested cells to effectively redistribute traffic from congested cells to non-congested cells thereby optimally balancing the load of the cellular network; m. collecting operating parameters of cellular towers generated by the optimization algorithm in step l; n. disseminating the operating parameters of step m to cell towers; and o. going back to step b to wait again for the expiration of said refresh timer.

2. The method of claim 1, wherein 5G deployment scenarios comprise standalone Long Term Evolution Advanced (LTE-A) scenarios in which only LTE-A control plane and data plane are used, non-standalone scenarios in which LTE-A control plane and Next-generation Radio (NR) data plane are used together, and standalone NR scenarios in which only NR control and data planes are used.

3. The method of claim 1, wherein the choice of prediction algorithm of step b comprises Multi-Layer Perceptron Deep Learning (MLPDL), Auto Regressive Integrated Moving Average (ARIMA) machine learning, and Linear Least Square Regression (LLSR) machine learning techniques.

4. The method of claim 1, wherein the choice of optimization algorithm of step c comprises Constrained Simulated Annealing (CSA), Block Coordinated Descent Simulated Annealing (BCDSA), and Genetic Algorithm (GA) algorithms.

5. The method of claim 1, wherein the measure of utilization of step i comprises downlink Physical Resource Blocks (PRBs) and Packet Dedicated Control CHannel (PDCCH).

6. The method of claim 1, wherein the choices of imported information of step j comprises dropped call rate, throughput, and accessibility rate.

7. The method of claim 1, wherein the operating parameters of step m comprise transmission power, handover thresholds, and antenna tilts.

8. The method of claim 7, wherein reducing the transmit power of a congested cellular tower results in reducing the coverage boundary of said cellular tower hence shifting users connected to said cellular tower far from its center to neighboring cellular towers thereby reducing the overall congestion of said cellular tower.

9. The method of claim 7, wherein increasing the handover of a cellular tower results in increasing the coverage of said cellular tower and shifting users from congested neighboring cellular towers to said cellular tower thereby reducing the congestion of congested neighboring cellular towers.

10. The method of claim 7, wherein antenna tilting choices comprise: a. down-tilting resulting in decreasing the coverage boundary of said cellular tower, shifting users connected to said cellular tower far from its center to neighboring cellular towers, and reducing the overall congestion of said cellular tower; and b. up-tilting resulting in increasing the coverage of said cellular tower, shifting users from congested neighboring cellular towers to said cellular tower, and reducing the congestion of congested neighboring cellular towers.

11. A computer program product stored in a non-transitory computer readable storage medium to redistribute traffic from congested cellular towers to non-congested cellular towers in a Fifth Generation (5G) cellular network for balancing the load of said cellular network wherein said cellular network comprises clusters, clusters comprise sites, and sites comprise cellular towers, and wherein the method comprises: a. code for importing per cellular tower information at least comprising frequency band, average transmit power, neighbor handover, antenna tilt, traffic demand, traffic carried, dropped call rate, throughput, accessibility rate, and minimum acceptable quality; b. code for choosing a prediction algorithm; c. code for choosing an optimization algorithm; d. code for choosing one or more operating frequency bands; e. if the choice of step d includes more than one frequency band, code for choosing between inter- or intra-frequency load balancing; f. code for forming a network adjacency matrix utilizing the neighbor handover information of step a along with the choices of step d and step e; g. code for waiting for the expiration of a refresh timer; h. code for importing additionally collected periodical measurements of cellular towers of step a since the previous expiration of the refresh timer of step g; i. code for applying the algorithm chosen in step b to predict congestion thresholds of the plurality of cellular towers one cellular tower at a time, wherein the congestion threshold of a cell tower reflects the average number of users connected to said cell tower associated with a preferred maximum utilization of said cellular tower; j. code for adjusting minimum acceptable quality bounds of the optimization based on the variations of the imported information of step a; k. code for setting optimization inputs comprising imported information of step a, predicted congestion thresholds of step i, and minimum acceptable quality bounds of step j; l. code for applying the optimization algorithm chosen in step c to redistribute traffic as the result of changing operating parameters of the plurality of both congested and non-congested cells to effectively redistribute traffic from congested cells to non-congested cells thereby optimally balancing the load of the cellular network; m. code for collecting operating parameters of cellular towers generated by the optimization algorithm in step l; n. code for disseminating the operating parameters of step m to cell towers; and o. code for going back to step b to wait again for the expiration of said refresh timer.

12. The computer program of claim 11, wherein 5G deployment scenarios comprise standalone Long Term Evolution Advanced (LTE-A) scenarios in which only LTE-A control plane and data plane are used, non-standalone scenarios in which LTE-A control plane and Next-generation Radio (NR) data plane are used together, and computer program standalone NR scenarios in which only NR control and data planes are used.

13. The computer program of claim 11, wherein the choice of prediction algorithm of step b comprises Multi-Layer Perceptron Deep Learning (MLPDL), Auto Regressive Integrated Moving Average (ARIMA) machine learning, and Linear Least Square Regression (LLSR) machine learning techniques.

14. The computer program of claim 11, wherein the choice of optimization algorithm of step c comprises Constrained Simulated Annealing (CSA), Block Coordinated Descent Simulated Annealing (BCDSA), and Genetic Algorithm (GA) algorithms.

15. The computer program of claim 11, wherein the measure of utilization of step i comprises downlink Physical Resource Blocks (PRBs) and Packet Dedicated Control CHannel (PDCCH).

16. The computer program of claim 11, wherein the choices of imported information of step j comprises dropped call rate, throughput, and accessibility rate.

17. The computer program of claim 11, wherein the operating parameters of step m comprise transmission power, handover thresholds, and antenna tilts.

18. The computer program of claim 17, wherein reducing the transmit power of a congested cellular tower results in reducing the coverage boundary of said cellular tower hence shifting users connected to said cellular tower far from its center to neighboring cellular towers thereby reducing the overall congestion of said cellular tower.

19. The computer program of claim 17, wherein increasing the handover of a cellular tower results in increasing the coverage of said cellular tower and shifting users from congested neighboring cellular towers to said cellular tower thereby reducing the congestion of congested neighboring cellular towers.

20. The computer program of claim 17, wherein antenna tilting choices comprise: a. down-tilting resulting in decreasing the coverage boundary of said cellular tower, shifting users connected to said cellular tower far from its center to neighboring cellular towers, and reducing the overall congestion of said cellular tower; and b. up-tilting resulting in increasing the coverage of said cellular tower, shifting users from congested neighboring cellular towers to said cellular tower, and reducing the congestion of congested neighboring cellular towers.

21. A system comprising processors and memory coupled to processors, the memory storing instructions readable by a computing device that, when executed by processors, cause processors to perform operations to redistribute traffic from congested cellular towers to non-congested cellular towers in a Fifth Generation (5G) cellular network thereby balancing the load of said cellular network wherein said cellular network comprises clusters, clusters comprise sites, and sites comprise cellular towers, and wherein the method comprises: a. importing per cellular tower information at least comprising frequency band, average transmit power, neighbor handover, antenna tilt, traffic demand, traffic carried, dropped call rate, throughput, accessibility rate, and minimum acceptable quality; b. choosing a prediction algorithm; c. choosing an optimization algorithm; d. choosing one or more operating frequency bands; e. if the choice of step d includes more than one frequency band, choosing between inter- or intra-frequency load balancing; f. forming a network adjacency matrix utilizing the neighbor handover information of step a along with the choices of step d and step e; g. waiting for the expiration of a refresh timer; h. importing additionally collected periodical measurements of cellular towers of step a since the previous expiration of the refresh timer of step g; i. applying the algorithm chosen in step b to predict congestion thresholds of the plurality of cellular towers one cellular tower at a time, wherein the congestion threshold of a cell tower reflects the average number of users connected to said cell tower associated with a preferred maximum utilization of said cellular tower; j. adjusting minimum acceptable quality bounds of the optimization based on the variations of the imported information of step a; k. setting optimization inputs comprising imported information of step a, predicted congestion thresholds of step i, and minimum acceptable quality bounds of step j; l. applying the optimization algorithm chosen in step c to redistribute traffic as the result of changing operating parameters of the plurality of both congested and non-congested cells to effectively redistribute traffic from congested cells to non-congested cells thereby optimally balancing the load of the cellular network; m. collecting operating parameters of cellular towers generated by the optimization algorithm in step l; n. disseminating the operating parameters of step m to cell towers; and o. going back to step b to wait again for the expiration of said refresh timer.

22. The system of claim 21, wherein 5G deployment scenarios comprise standalone Long Term Evolution Advanced (LTE-A) scenarios in which only LTE-A control plane and data plane are used, non-standalone scenarios in which LTE-A control plane and Next-generation Radio (NR)

data plane are used together, and standalone NR scenarios in which only NR control and data planes are used.

23. The system of claim 21, wherein the choice of prediction algorithm of step b comprises Multi-Layer Perceptron Deep Learning (MLPDL), Auto Regressive Integrated Moving Average (ARIMA) machine learning, and Linear Least Square Regression (LLSR) machine learning techniques.

24. The system of claim 21, wherein the choice of optimization algorithm of step c comprises Constrained Simulated Annealing (CSA), Block Coordinated Descent Simulated Annealing (BCDSA), and Genetic Algorithm (GA) algorithms.

25. The system of claim 21, wherein the measure of utilization of step i comprises downlink Physical Resource Blocks (PRBs) and Packet Dedicated Control CHannel (PDCCH).

26. The system of claim 21, wherein the choices of imported information of step j comprises dropped call rate, throughput, and accessibility rate.

27. The system of claim 21, wherein the operating parameters of step m comprise transmission power, handover thresholds, and antenna tilts.

28. The system of claim 27, wherein reducing the transmit power of a congested cellular tower results in reducing the coverage boundary of said cellular tower hence shifting users connected to said cellular tower far from its center to neighboring cellular towers thereby reducing the overall congestion of said cellular tower.

29. The system of claim 27, wherein increasing the handover of a cellular tower results in increasing the coverage of said cellular tower and shifting users from congested neighboring cellular towers to said cellular tower thereby reducing the congestion of congested neighboring cellular towers.

30. The system of claim 27, wherein antenna tilting choices comprise: a. down-tilting resulting in decreasing the coverage boundary of said cellular tower, shifting users connected to said cellular tower far from its center to neighboring cellular towers, and reducing the overall congestion of said cellular tower; and b. up-tilting resulting in increasing the coverage of said cellular tower, shifting users from congested neighboring cellular towers to said cellular tower, and reducing the congestion of congested neighboring cellular towers.

* * * * *